Dec. 27, 1955     E. F. GREINER     2,728,455
GRADING MACHINE FOR SHRIMPS
Filed Sept. 23, 1954     4 Sheets-Sheet 1

INVENTOR
ELBERT F. GREINER
ATTORNEYS

Dec. 27, 1955  E. F. GREINER  2,728,455
GRADING MACHINE FOR SHRIMPS
Filed Sept. 23, 1954  4 Sheets-Sheet 2

INVENTOR
ELBERT F. GREINER

BY *H.M. Willson & Co.*

ATTORNEYS

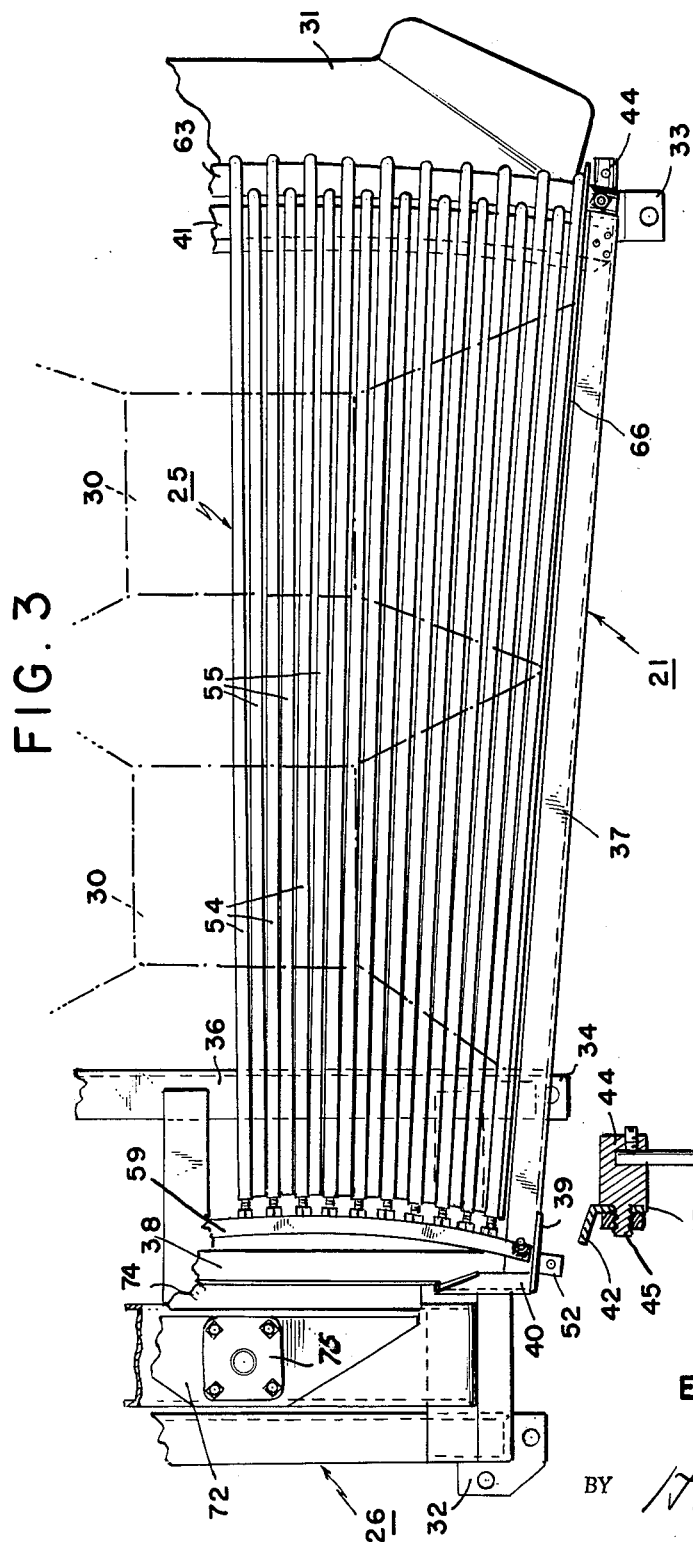

Dec. 27, 1955 E. F. GREINER 2,728,455
GRADING MACHINE FOR SHRIMPS
Filed Sept. 23, 1954 4 Sheets-Sheet 4
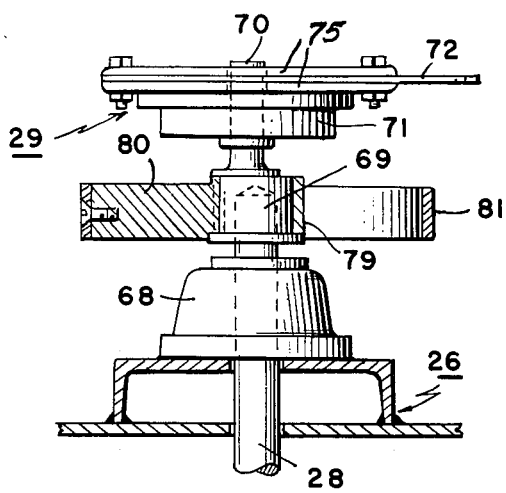
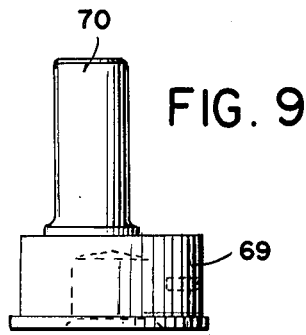
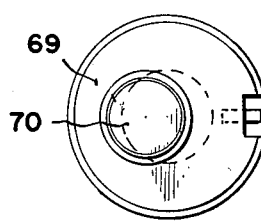
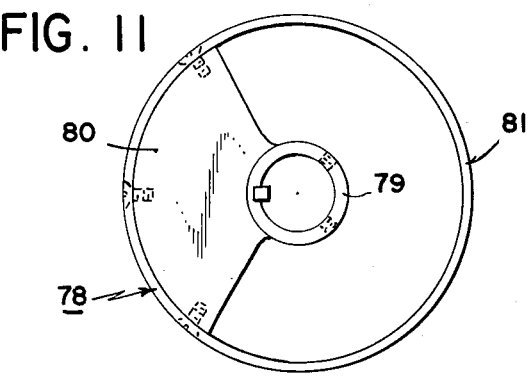
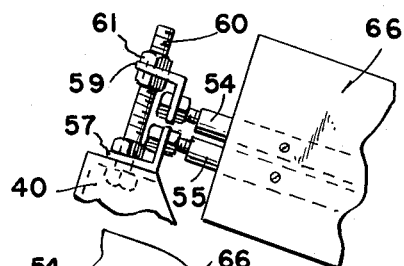
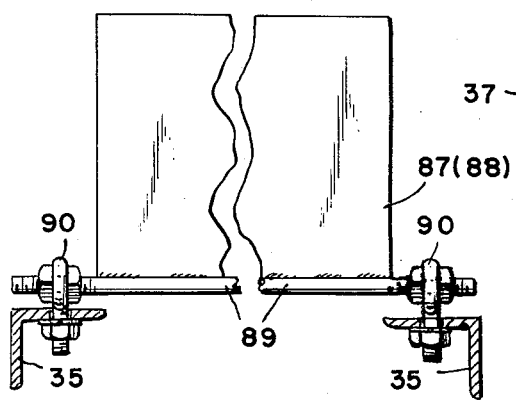
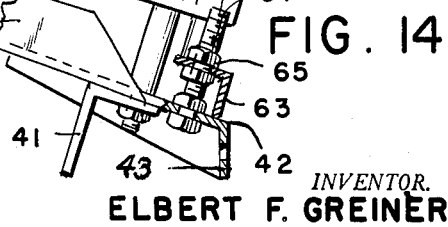
INVENTOR.
ELBERT F. GREINER United States Patent Office 2,728,455
Patented Dec. 27, 1955

2,728,455
GRADING MACHINE FOR SHRIMPS
Elbert F. Greiner, New Orleans, La.
Application September 23, 1954, Serial No. 457,805
12 Claims. (Cl. 209—99)

This invention relates to size-grading or assorting machines; and it is particularly adapted for assorting somewhat flat and elongated bodies or products such as shrimps and size-grading them in accordance with their smallest transverse dimension. The present disclosure of the invention deals particularly with its use for handling either head-on shrimps, headless shrimps or the peeled meats of shrimps but it will be understood that the invention may be adapted for other uses.

All shrimps, whether fresh, frozen or canned are sold in accordance with recognized size grades. It is therefore essential that they be purchased from the boats on a basis of size. As the catch is comprised of various size shrimps it is now customary to estimate the percentage of the various sizes in the load, or to hand grade, and then pay the fishermen accordingly. Either method is not entirely satisfactory as estimating is not sufficiently accurate and hand grading is both slow and expensive.

The principal object of the invention is to provide a simple, practical and highly effective machine which will assort shrimps into desired sizes and which will satisfactorily grade head-on shrimps just as they come from the water, headless shrimps whether raw or cooked, and peeled tail meats whether raw or cooked.

A shrimp has a front portion containing the digestive tract, head, antenna, etc., and a rear portion or body containing the edible muscle meat, commonly called the tail meat. The body or tail portion of the shrimp is longitudinally curved and tapered and in cross section it is somewhat oval or egg-shaped. The thickness or dimension from side to side of the body in approximately one-half of the vertical dimension, that is, the height or thickness from the back to the underside. Hence a shrimp when dropped on a flat surface will rest on one side or the other. I have taken advantage of these facts in creating the invention. It contemplates the grading of the shrimps on the same dimension by causing them to travel down an inclined vibratory separator or grader member composed of bars which diverge from their upper to their lower ends and which are arranged in upper and lower series, the bars of the lower series being below and midway of the planes of next adjacent bars of the upper series so that the grader has a plurality of longitudinal channels or troughs, each formed by three of the bars disposed in triangular relation, the shrimps moving in lengthwise positions down the channels with their flat sides supported on the lower bars of the channels until each shrimp reaches a point at which the spacing of the lower and upper bars of a channel is greater than the thickness or transverse width of the shrimp. At such point the shrimp will drop from the channel or trough to one side or the other of the lower bar of that channel, the shrimps being caught by suitable longitudinally spaced chutes or receptacles according to the sizes or grades desired. It is therefore an important object of the invention to provide an improved machine for grading shrimps or other somewhat flat objects, articles or products on the same dimension.

Another object of the invention is to provide a machine of this character with an improved gyratory separator and grading member composed of diverging bars or rods arranged alternately at different heights to provide channels for the shrimps to travel in a lengthwise direction and improved means for adjusting the rods relative to each other so that the machine will effectively grade various sizes and conditions of shrimps. The machine may thus be adjusted to grade peeled meats, headless or head-on shrimps.

Another object is to provide a machine in which a grader member of the above indicated character is supported by upright spring rods and is given a circular motion to cause the shrimps to be immediately thrown into the channels and hence preventing them from riding the upper bars.

Another object is to provide in a grader of this character adjustable deflector elements beneath the grader member to quickly control the size of grade, that is, the number of shrimps per pound, without adjusting the grader rods when a small change is desired, this being done while the machine is in operation.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 3 is a detail top plan view showing approximately one-half of the grader member and some of the associated parts;

Figs. 4, 5 and 6 are diagrammatic sectional views taken at longitudinally spaced points along a group of three of the rods or bars forming one of the channels or troughs of the grader;

Fig. 7 is a detail view partly in section showing the mounting of one of the spring rods for supporting the grader member for circular motion;

Fig. 8 is an enlarged detail vertical section taken substantially on the line 8—8 in Fig. 2 showing the eccentric drive which gives the grader member a limited circular motion;

Figs. 9 and 10 are side and end views respectively of the eccentric pin element;

Fig. 11 is a top view of the counterbalance element;

Fig. 12 is a perspective view of the spring plate connection between the frame of the grader member and the eccentric drive;

Fig. 13 is an enlarged detail section showing the adjustment between the upper and lower series of grader rods at the front or feeding end of the grader member;

Fig. 14 is an enlarged detail section showing the adjustable mounting of the grader bars or rods at the lower discharge end of the machine; and Fig. 15 is a detail section showing the pivotal mounting and adjustment of one of the deflector plates.

Figure 1:
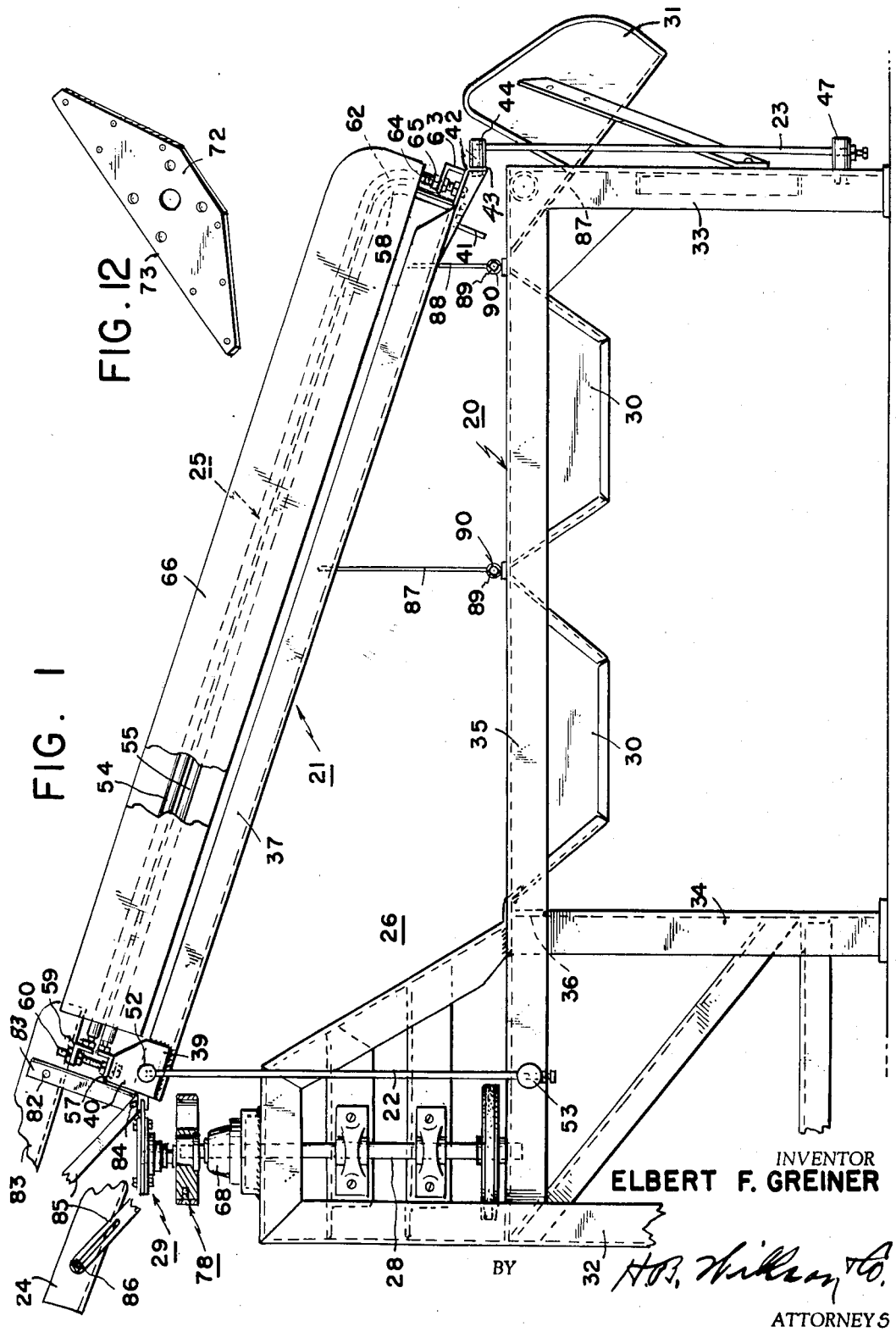
Fig. 1 is a side elevation of the improved grader, parts being broken away and in section.

The machine comprises generally a base 20 above which is an elongated downwardly and rearwardly inclined grader member or body 21 supported from the base by upright round steel rods, there being preferably a front pair 22 and a rear pair 23 of such rods, so that the grader body may oscillate or vibrate both longitudinally and transversely. Shrimps are deposited on an adjustably inclined feeding trough 24 carried by the front and upper end of the body 21 to spread the shrimps on a grading means 25 on said body. In an elevated portion 26 of the base frame 20 is an electric motor 27 which drives an upright shaft 28, and between the latter and the upper front end of the grader frame 21 is an eccentric drive 29 which gives the latter a circular motion. The shrimps graded by the means 25 fall into two or more chutes 30 and off of the end of the grader means onto a chute or pan 31. Suitable collecting receptacles, not shown, are placed beneath the chutes to receive the graded shrimps.

The elongated and rectangular main frame 20 and its upward extension 26 are made of structural metal members such as aluminum angle bars. The base portion includes pairs of front legs 32, rear legs 33 and intermediate legs 34 supporting an open top. The latter includes angle metal side bars 35 connected by similar cross bars 36. The legs are suitably braced as shown. The base frame is wider at its rear end than at its front end, as is also the frame of the grader body or member 21. The latter is also an open frame which includes two opposed and rearwardly diverging angle metal side bars 37 united at their front ends by a straight angle metal cross bar 38, the ends of these bars being connected by corner gussets 39 in the form of angular members having upward extentions 40. The rear ends of the diverging bars 37 are connected by a longitudinally curved angle metal cross bar 41. The latter is spaced from the rear ends of the bars 37 which ends have their vertical flanges cut away and their horizontal flanges 42, beyond the bar 41, bent downwardly at 43.

The resilient supporting rods 23 are connected between the ends or flanges 43 and the rear legs 33 as shown in Figs. 1 and 7, the connection permitting vertical adjustment of the lower rear end of the grader frame 21 so that its downward inclination may be varied. Each spring rod has its upper end secured by a set screw in a transverse socket in a stud-like bracket 44 secured to the depending flange 43, as seen in Fig. 7. The bracket may be formed with a screw stud 45 which is held in a hole in the flange 43 by a nut. The lower end of the rod 23 has a limited vertical adjustment in a transverse bore 46 of a similar stud-like bracket 47, mounted on the leg 33, the extremity of the rod resting on a screw 48 threaded into the lower end of the bore and secured by a lock nut. Greater vertical adjustment of the rod 23 is obtained by vertically adjusting the bracket 47 as by forming it with a screw stud 49 adapted to be entered in any of a vertical series of holes 50 in one flange of the angle metal leg 33 and applying a nut 51. The round steel supporting rods 22 at the front of the machine may be similarly mounted but no adjustment is necessary. As shown the upper end of each rod 22 is fixed in a bracket 52, like the bracket 44, the bracket or stud being fastened to the outer side of one of the corner gussets 39. The lower ends of the rods 22 may be adjustably seated in brackets 53, like the brackets 47, but fastened to the depending flanges of the side bars 35.

The size grading means 25 on the frame 21 comprises a plurality of grader bars or rods disposed in rearwardly diverging and downwardly inclined positions. These bars are arranged in upper and lower series, the bars of the upper series being numbered 54 and those of the lower series 55. The bars of the upper series may be parallel with those of the lower series but they are vertically adjustable so that the bars of the two series will diverge in a rearward direction. The bars 55 of the lower series are disposed midway of the vertical planes of next adjacent bars of the upper series. The bars 54 and 55 thus alternate across the grader or separator and form in its top a plurality of downwardly inclined channels or troughs 56 which gradually widen from the receiving end to the discharge end, and which may also be gradually deepened by relative vertical adjustment of the bars of the two series. While the grader bars may be of any suitable cross sectional shape they are preferably constructed of cylindrical aluminum or other metal rods as shown.

It will be seen upon reference to Figs. 4, 5 and 6 that each of the troughs 56 is formed by the triangular arrangement of two adjacent upper bars 54 and the lower bar 55 which is between those upper bars. The spacing of the grader bars is such that when shrimps are dropped upon the upper or front portions of the bars while the frame is being vibrated or gyrated some of the shrimps will fall into the troughs while others will be disposed crosswise thereof since at that point the troughs may not be wide enough to receive them. However those on top of the bars 31 will be caused to be turned lengthwise of the troughs by the circular motion of the frame 21 and will fall into wider lower portions of the troughs, by reason of the movement of and the downward inclination of the bars. The letter S in Figs. 4, 5 and 6 conventionally represents the cross sectional outline of a shrimp. Fig. 4 is taken through the upper portion of a trough or channel 56 where the bars 54 are too closely spaced to permit the shrimp to assume the horizontal position shown in Fig. 5 which latter is taken through the trough at a point more distant from its upper end. At that point the spacing of the bars 54 from the bar 55 is not as great as the width of the shrimp but as the shrimp moves further down the trough the spacing of the bars is sufficiently great to permit the shrimp to drop from it upon one side or the other of the lower bar 55, as seen in Fig. 6. Thus all of the shrimps will be graded according to their widths which is their smallest transverse dimension. Any desired number of grades may be provided for by permitting the shrimps to fall from the bars into suitably arranged chutes or receptacles. The parts may be so proportioned that all of the shrimps will pass through the grader bars and only large foreign objects will be discharged from the lower ends of the bars but as later described the disclosed machine is intended to grade three sizes of shrimps.

Since the shrimps will travel lengthwise down the troughs with their flat sides resting on the lower bars 55 until they reach a point where the spacing between the bars 54 and 55 is greater than their widths, it is necessary at times to vary the vertical spacing between the bars of the two series in order to handle different catches of head-on shrimps and also shrimps that have been deheaded or that have been peeled. In order to enable the machine to grade the three classes or conditions of shrimps, I provide at the receiving end means for quickly adjusting the bars of the upper series toward and from those of the lower series and also a similar adjustment at the discharge end. The upper and lower bars are relatively adjusted but it is preferable to adjust the bars of the upper series.

The lower bars 55 have their upper ends evenly spaced along one flange of a longitudinally curved angle bar 57, the other flange of which has its ends fastened to the portions 40 of the corner gussets 39. The lower ends of the bars 55 have downwardly curved portions 58 fastened to the rearwardly projecting flange of the curved angle bar 41. The upper ends of the upper bars 54 are fastened to the depending flange of a longitudinally curved angle bar 59 which is disposed vertically above the bar 57 and which is adjustable toward and from the latter to vary the vertical spacing of the bars 54 above the bars 55. This adjustment is effected by the use of upright screw studs or rods 60 at the ends of these bars. The upper ends of the studs or bolts pass through openings in the forwardly directed flange of the bar 59 and carry nuts 61 above and below that flange. The lower ends of these studs pass through openings in the lower bar 57 and the tops of the portions 40 of the corner gussets and carry nuts as shown in Fig. 13 so that the studs or bolts also serve to fasten the bar 57 to the gussets. The lower ends 62 of the upper bars 54 are also curved downwardly on a greater radius than the bars 55, and are fastened to the forwardly directed flange of a longitudinally curved angle bar 63 disposed above and rearwardly of the bar 41. That flange of the bar 63 projects beyond its other flange and its ends are disposed over the flange 42 of the bars 37. Screw studs 64 have their lower ends fastened in the flanges 42 and their upper ends extend through holes in the bar 63 and receive nuts 65 to permit of the vertical adjustment of the bar 63 and hence the adjustment of the lower ends of the upper series of the grader bars 54 toward and from the bars 55 of the lower series. It will be noted that the bars 55 are longer than the bars 54 and the radius of their curved ends 62 is greater than that of the curved ends 58 of the lower bars. That arrangement has been found to create a sufficient gap between the bars at their discharge ends to permit the shrimps to fall off the grader without wedging. The grader bars are preferably made of aluminum rods to the ends of which reduced brass screws are fastened. These screws pass through openings in the flanges of the angle bars and receive nuts to fasten the bars, as shown. To prevent shrimps from falling off of the sides of the grading means, upright side plates or guards 66 are welded to the two outermost bars 55.

Figure 2:
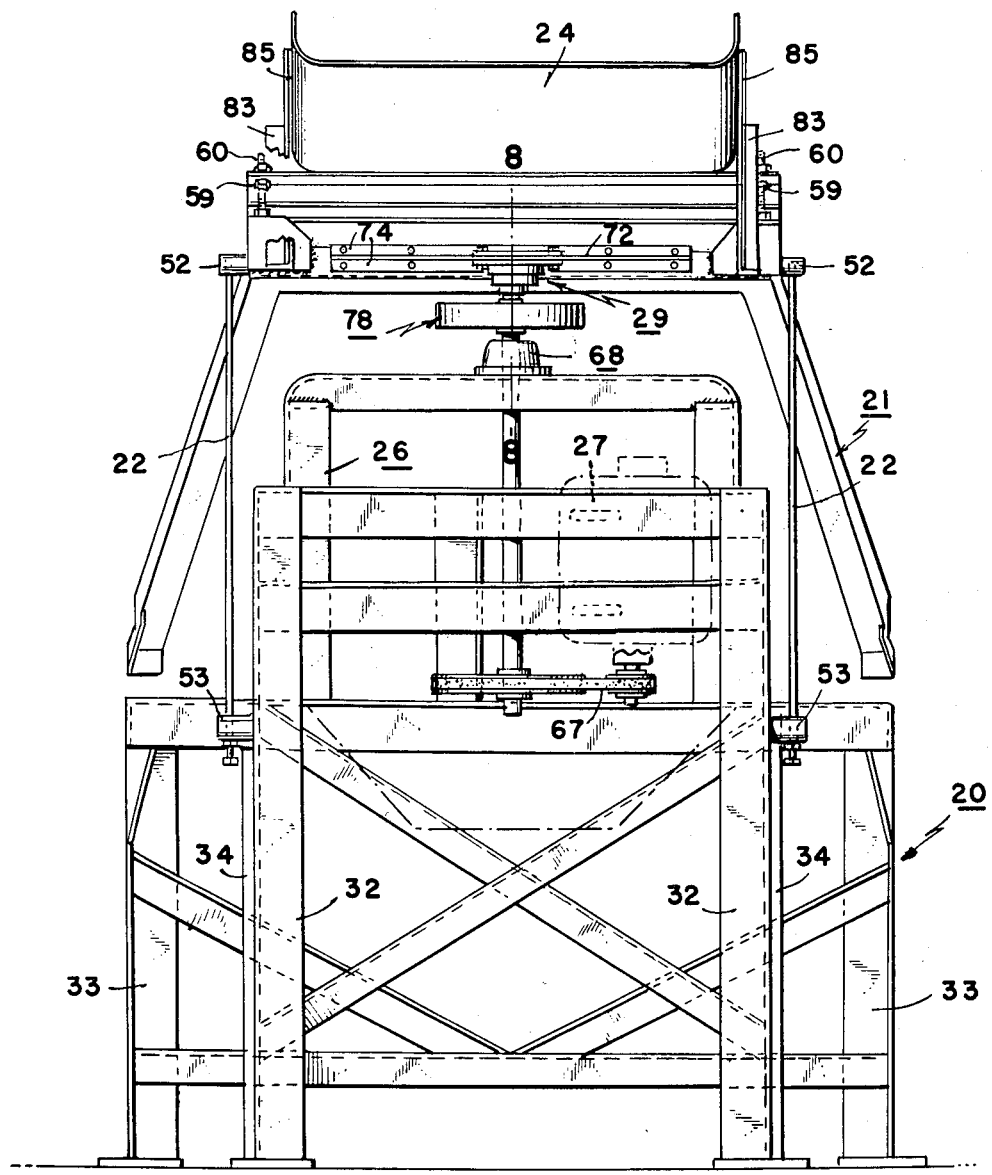
Fig. 2 is an end elevation of the front or feeding end of the machine, some parts being broken away and some omitted.

As indicated in Fig. 2, the electric motor 27 is adjustably mounted in the frame portion 26 and its shaft is connected by a belt 67 and pulleys to the lower end of the drive shaft 28. The latter is mounted in suitable bearings including an upper bearing 68 carried at the center of a cross beam at the top of the frame portion 26. Keyed to the projecting upper end of the shaft 28 is a socketed cylindrical hub or collar 69 formed on its top with an eccentric upwardly projecting pin 70 which is connected to the front end of the grader frame 21 to provide the eccentric drive 29 for the latter. The eccentric pin or stud 70 rotates in a hub member 71 which is connected by a spring steel plate 72 to the frame 21. This plate, as shown in Fig. 12, has a wide central portion and its ends are oppositely tapered to a straight rear edge 73 which has a length somewhat less than the width of the frame 21. The edge portion 73 is bolted between opposed flanges of upper and lower angle bars 74, the other flanges of which are secured by screws or bolts to the upright flange of the angle cross bar 38 of the frame 21. The wide central portion of the spring plate 72 is fastened between upper and lower rectangular plates 75 fixed on the hub member 71 which may have any suitable form of bearing for the eccentric pin 70. By thus connecting the grader frame to the eccentric pin and by supporting the frame on the four steel rods 22 and 23, the frame will be given a circular or gyrating motion which causes shrimps to be quickly thrown into the channels formed by the grader bars, and effectively moved down these inclined bars. I have found that by having the pin 5/16" off center the grader member will have a sufficient circular motion for satisfactory operation.

In order to reduce the vibration in the main frame, I mounted a counter-balance 78, shown in Fig. 11, on the hub portion 69 of the eccentric. This counter-balance has a cylindrical hub portion 79 which is keyed or otherwise fixed on the cylindrical hub 69 and which is formed on one side with a weight portion 80 having an outer edge concentric with the hub axis. Fastened to the arcuate edge of the weight 80 by screws or the like is a cylindrical guard ring 81 concentric with the hub 79. The use of this counter-balance reduces vibration of the main frame to such an extent that it is hardly necessary to lag the machine to the floor.

The feeding trough or chute 24 is channel shape in cross section and has the rear portions of its sides pivoted at 82 to upright angle metal brackets or posts 83 fastened to the rear faces of the corner gussets 39. Pivoted to the lower portions of these posts at 84 are a pair of chute adjusting links 85. The free ends of these links or arms 85 are slotted to receive clamping screws or bolts 86 carried by the front portions of the side walls of the chute 24. By this means the downward inclination of the chute may be varied to control the discharge of the shrimp deposited on the chute. It is to be noted that the feeding chute is carried by the frame 21 and hence has the circular motion of the latter, and it is has been found that by adjusting the pitch of the receiving chute to accommodate the various types of shrimps to be graded, an even spread of shrimps across the grader bars is obtained.

The machine shown is designed to have small shrimps drop into the first chute or hopper 30, the medium size into the second chute 30 and the large size into the chute 31. The bottom 87 of the chute 31 extends up under the rear portions of the grader bars as shown in Fig. 1 so that shrimp dropping through those portions as well as shrimp passing off of the ends of the bars will be deposited in the chute 31. All three chutes are made of sheet metal suitably fastened to the main frame.

The grader bars 54 are adjusted at the time of installation of the machine to accommodate the type or style of shrimps to be graded, i. e. peeled meats, headless or head-on. Because peeled meats of shrimps are smaller than the same size shrimps would be if the heads and shells were not removed, it is necessary to adjust the bars closer together. The bars are opened wider for headless, and still wider for head-on shrimps. The normal adjustment for desired units per pound is made by lowering or raising the bars 54 at the discharge end of the machine. That may be quickly done by adjusting the nuts 65 on the screw studs or rods 64. The adjustment of the bars 54 at the receiving end of the machine by means of the nuts 61 on the screws 60 provides a more minute bar adjustment to suit all classes of shrimps. These adjustments of the bar spacing are only necessary when extremely large or small sizes are encountered or when the operator desires to change from headless shrimps to peeled meats or head-on shrimps.

In addition to these bar spacing adjustments, I may control the size or grade to a limited extent while the machine is in operation by the use of pivoted deflector plates or blades mounted across the top of the main frame between next adjacent hoppers or chutes, as seen in Fig. 1. Two similar plates 87 and 88 are shown. Each has its lower edge welded to a pivot rod 89 with projecting screw threaded ends rotatably mounted in opposed eye bolts 90 fastened on the tops of the side bars 35 adjacent the upper edges of adjoining chutes. Nuts 91 applied on the threaded ends may be tightened against the bearing eyes 90 to frictionally retain the deflector plate in adjusted position. By inclining the plates 87—88 forward or backward the size of the grade (number of shrimps per pound) falling into the chutes or collecting receptacles may be changed. This adjustment will vary the count by a few shrimps to the pound.

In actual practice applicant's shrimp grading machine has been found to be extremely versatile since by quick and easy adjustment of the grader bars, the feed pan and the deflector plates, it may be used to effectively grade peeled meats, headless or head-on shrimps to the three standard grades. The circular motion of the grader body and its attached feed pan causes the shrimps dumped on the pan to be distributed across the front or upper portions of the grader bars and also causes the shrimps to be quickly fed into the various channels down which they slide until they drop between adjacent bars. The grading is not only effective but rapid, since the shrimps may be fed to the pan by a conveyor in a bunched or matted condition and will be quickly spread laterally and distributed to the various channels.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A shrimp grading machine comprising an elongated grader member supporting upper and lower series of grader bars all arranged in rearwardly diverging relation, the bars of the lower series being midway of next adjacent bars of the upper series, and the bars of the lower series being in a plane which diverges in a downward and rearward direction from the plane of the bars of the upper series to provide longitudinal channels which widen and deepen in a rearward direction, resilient means supporting said member to vibrate in both longitudinal and transverse directions with said bars downwardly inclined in a rearward direction, and means to gyrate said member on its resilient supporting means and give it a circular motion, said gyrating means including an upright driven shaft with an eccentric and a connection between said eccentric and the front portion of said member.

2. The structure of claim 1 in which said eccentric includes a pin and said connection comprises a resilient metal plate having a rear edge extending substantially across the front end of said member and fixed thereto and a bearing fixed to the central front portion of said plate to receive said eccentric pin.

3. The structure of claim 1 together with a downwardly and rearwardly inclined shrimp feeding trough pivotally connected to the front end of said member, and means between said trough and a fixed portion of said member to vary the angle of inclination of said trough.

4. The structure of claim 1 in which said member has a body frame of generally rectangular shape and is disposed over an open base frame of generally rectangular shape, and in which said resilient supporting means comprises upright resilient rods having their upper ends connected adjacent the corners of said body frame and their lower ends connected to the base frame.

5. The structure of claim 4 in which the connection between the lower ends of the upright rods at the rear portion of the body frame includes adjustable means to permit raising or lowering of the last mentioned rods to vary the downward inclination of the grader bars.

6. The structure of claim 4 in which said base frame includes opposed side beams, together with at least one upright deflector plate supported from said side beams and extending across the base frame beneath the grader bars, said deflector plate having its lower portion pivotally mounted to permit its upper portion to swing in a forward or rearward direction to deflect shrimps dropping from grader bars into one or the other of separate receiving means, and means retaining said deflector plate in different positions of angular adjustment.

7. The structure of claim 1 in which said member includes a body frame together with means associated with said body frame and the ends of the grader bars of at least one series to simultaneously adjust the bars of that series relative the bars of the other series in a vertical direction to vary the depth of said channels.

8. The structure of claim 7 in which said last mentioned means is at the front end of said body frame and comprises upper and lower cross bars to which the upper ends of the grader bars of the two series are respectively fastened, said lower cross bar being fixed to the body frame, upright screw rods rising from said body frame and passing through openings in the end portions of said upper cross bar and pairs of nuts on said screw rods positioned above and below said upper cross bars to hold the latter in adjusted position relative to the lower cross bar.

9. The structure of claim 1 in which said member includes a body frame having side bars connected by front and rear end bars, together with means associated with said body frame and the rear ends of the grader bars of the two series to simultaneously adjust the bars of the upper series vertically with respect to the bars of the lower series to vary the depth of the channels, the bars of said lower series having their lower ends downturned and fixed to said read end bar, the bars of said upper series being also turned downwardly and spaced rearwardly of the downturned ends of the lower series of bars, said adjusting means comprising a cross bar to which the downturned ends of the upper series of bars are fastened, the ends of said cross bar being disposed over the said side bars of the body frame and apertured, upright screw rods on the last mentioned bars and disposed in said apertures, and nuts on each of said screw rods above and below said side bars to hold the cross bar in adjusted position.

10. In a shrimp grader, a gyratory grader frame having longitudinally extending channels formed by upper and lower series of downwardly extending grader bars, the channels increasing in width and depth from their upper front ends to their lower rear ends, substantially round resilient rods supporting said frame for circular gyratory movement, and means imparting a circular movement to said frame, said means including an eccentric rotatable on an upright axis and a driving connection between said eccentric and the upper front end of said frame.

11. The structure of claim 10 together with a downwardly and rearwardly inclined shrimp feeding pan pivotally supported from the front portion of said frame and movable therewith, and means to vary the inclination of said pan.

12. The structure of claim 10 together with means to vertically adjust at least some of said resilient rods to vary the downwardly inclination of said grader bars.

References Cited in the file of this patent

UNITED STATES PATENTS

| 359,514 | Mueller | Mar. 15, 1887 |
| 2,159,549 | Cecka | May 23, 1939 |

FOREIGN PATENTS

| 538,063 | Great Britain | July 18, 1941 |
| 688,275 | Great Britain | Mar. 4, 1953 |